No. 860,828. PATENTED JULY 23, 1907.
J. B. SCHÄFER.
FREEZING MACHINE.
APPLICATION FILED JAN. 14, 1907.
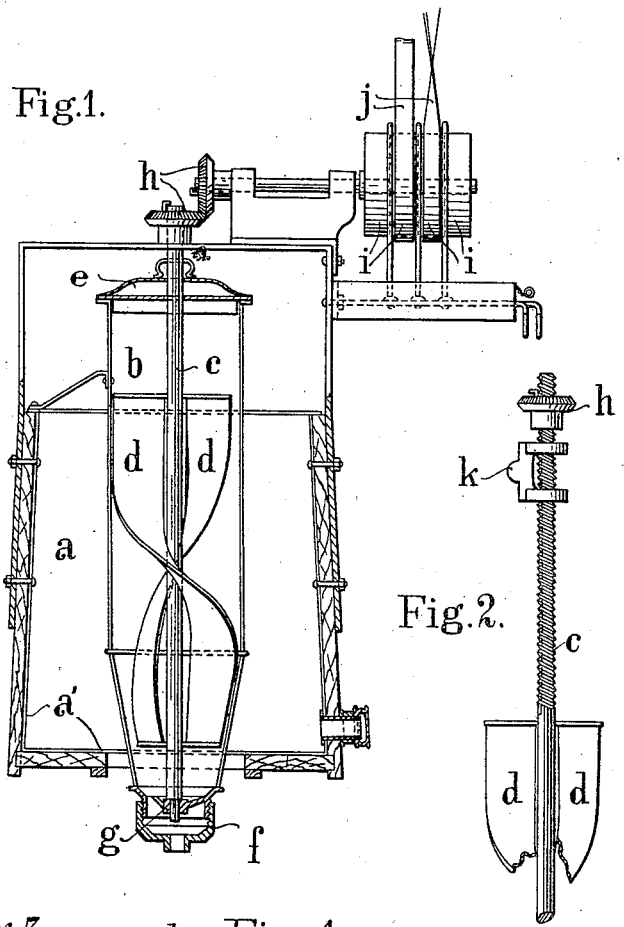

UNITED STATES PATENT OFFICE.

JEHU BAXTER SCHÄFER, OF LONDON, ENGLAND.

FREEZING-MACHINE.

No. 860,828.   Specification of Letters Patent.   Patented July 23, 1907.

Application filed January 14, 1907. Serial No. 352,216.

*To all whom it may concern:*

Be it known that I, JEHU BAXTER SCHÄFER, residing at 23 Lower Clapton road, London, England, commercial agent, and a citizen of the United Kingdom of Great Britain and Ireland, have invented certain new and useful Improvements in and Connected with Freezing-Machines, of which the following is a specification, such as will enable others skilled in the art to which it appertains to make and use the same.
This invention relates to machines used for freezing ice cream and the like, and refers to that class of machine in which two receptacles or vessels are used, one being arranged within the other. The freezing mixture is placed in the outer receptacle and the cream in the inner vessel. It is usual to mix the cream with rotating blades or spaddles and to force the cream out by the blades.

My invention consists in providing a better means of emptying the cream from the machine and of raising the blades from the same so as to prevent them forcing the cream downwards too much and to enable the blades to be cleaned. The blades are twisted or screw-shaped so as to drive the cream downwards when they are rotated in one direction and to tend to lift it when rotated the other way. At the lower end of the ice cream vessel I arrange an outlet consisting of open spaces around a bearing, which supports the spindle and this outlet is provided with a screw cap or other suitable cover, which may have outlets, covered by other caps or plugs of different sizes to cause the cream to emerge in different thicknesses or shapes. When the ice cream is sufficiently mixed and set, the cover is removed and the cream is forced out by the blades. The blades may be of solid or open work construction and be made to closely fit or scrape the sides of the vessel or be at a little distance from it. The blades may be mounted on a sleeve or its equivalent adapted to rotate with or on a spindle. This spindle may be threaded and a nut arranged on it in such a manner that when the blades are rotating in the direction for forcing down the ice-cream it does not interfere with the position of the blades, but if the rotation of the blades is reversed the nut, which does not rotate or may be held by the hand causes the blades to raise themselves out of the ice cream. Any suitable arrangements such as pulleys, cog wheels or cranks are connected or attached to the spindle to rotate it and the sleeve.

By my invention the cream can be continuously poured into the inner vessel and when ready pressed out quickly at the outlet beneath.

I will now describe my invention with reference to the accompanying drawings in which:—

Figure 1. is a sectional view of a freezing machine constructed according to my invention and designed to be driven by power. Fig. 2. shows a threaded spindle with a nut for raising it and the blades the top ends of which only are shown. Fig. 3. is an enlarged view of the bearing for the spindle. Fig. 4. shows a cap for the ice-cream outlet, said cap having an opening of oblong shape which will cause the ice-cream to assume a flat or band-like shape when passing out of the machine.

$a$ is the outer receptacle shown with a lining $a'$ and holding a vessel $b$ in which the spindle $c$ carrying blades $d$ rotates. These blades are of different sizes, one being designed to closely fit or scrape the sides of the vessel and the other at a distance from the sides. The vessel $b$ has removable cover $e$ on its higher end and at its lower end is threaded to receive the cap $f$.

A bearing $g$ is arranged in the vessel to carry the spindle $c$. The spindle with the blades is driven by the gear wheels $h$ from the fast and loose pulleys $i$, $i$, around which belts $j$, $j$, run, one of said belts being crossed to produce a reverse action. In Fig. 2. the spindle is screw threaded and nut $k$ is of double form and provided with a lug to facilitate handling it.

In Fig. 3. the bearing has openings $l$ through which the cream passes and in Fig. 4. the opening or passage is indicated by the letter $m$.

What I claim and desire to secure by Letters Patent is:—

In combination, an outer receptacle having an opening in its bottom, an inner receptacle projecting through the opening in the outer receptacle, said inner receptacle being opened at both ends, a spindle, bearings carried by the outer receptacle and inner receptacle for supporting the spindle, said spindle extending within the inner receptacle, blades carried by the spindle and closures for the opened ends of the inner receptacle, one of said closures having a delivery opening directly beneath an open end of the inner receptacle.

In witness whereof I have hereunto set my hand in presence of two witnesses.

JEHU BAXTER SCHÄFER.

Witnesses:
 HY. FAIRBROTHER,
 JN. ALDRIDGE.